United States Patent
Zhao et al.

(10) Patent No.: US 10,437,045 B2
(45) Date of Patent: Oct. 8, 2019

(54) OPTICAL SWITCH USING ALIGNED COLLIMATOR ARRAYS THAT ARE SPECIFICALLY ANGLED TO FACING MEMS CHIPS

(71) Applicant: Huawei Technologies Co., Ltd., Shenzhen (CN)

(72) Inventors: Xing Zhao, Shenzhen (CN); Chendi Jiang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 286 days.

(21) Appl. No.: 15/630,625

(22) Filed: Jun. 22, 2017

(65) Prior Publication Data
US 2017/0293137 A1 Oct. 12, 2017

Related U.S. Application Data

(63) Continuation of application No. PCT/CN2014/094512, filed on Dec. 22, 2014.

(51) Int. Cl.
*G02B 26/08* (2006.01)
*G02B 6/35* (2006.01)
(Continued)

(52) U.S. Cl.
CPC ........... *G02B 26/0833* (2013.01); *G02B 6/35* (2013.01); *G02B 6/3556* (2013.01); *G02B 26/08* (2013.01);
(Continued)

(58) Field of Classification Search
CPC .. G02B 26/0833; G02B 26/08; G02B 6/3556; G02B 6/35; G02B 27/30; H01Q 11/00; H04J 14/02
See application file for complete search history.

(56) References Cited

U.S. PATENT DOCUMENTS

| 6,567,574 B1 | 5/2003 | Ma et al. | |
| 6,798,992 B1* | 9/2004 | Bishop | G02B 6/359 356/73.1 |

(Continued)

FOREIGN PATENT DOCUMENTS

| CN | 1451981 A | 10/2003 |
| CN | 104181690 A | 12/2014 |
| JP | 2004294989 A | 10/2004 |

OTHER PUBLICATIONS

Machine Translation and Abstract of Japanese Publication No. JP2004294989, Oct. 21, 2004, 21 pages.
(Continued)

*Primary Examiner* — Andrew Jordan
(74) *Attorney, Agent, or Firm* — Conley Rose, P.C.

(57) ABSTRACT

An optical switch, including an input collimator array, an input micro-electro-mechanical system (MEMS) chip, an output MEMS chip, and an output collimator array. An included angle (β) exists between a surface of a micromirror array on the output MEMS chip and a surface of a lens array of the output collimator array, micromirrors of the micromirror array on the output MEMS chip are arranged at an equal spacing (L) both in a direction parallel to a first direction and in a direction perpendicular to the first direction, where the first direction is a direction of an intersection line of planes to which the surface of the lens array of the output collimator array and the surface of the micromirror array on the output MEMS chip belong, and lenses of the lens array of the output collimator array are arranged with the same arrangement of micromirrors of the output MEMS chip.

14 Claims, 3 Drawing Sheets

(51) Int. Cl.
*H01Q 11/00* (2006.01)
*H04J 14/02* (2006.01)
*G02B 27/30* (2006.01)

(52) U.S. Cl.
CPC ............. *G02B 27/30* (2013.01); *H01Q 11/00* (2013.01); *H04J 14/02* (2013.01)

(56) References Cited

U.S. PATENT DOCUMENTS

| | | | |
|---|---|---|---|
| 6,917,733 B1 | 7/2005 | Campbell et al. | |
| 6,922,500 B2 * | 7/2005 | Huang | H04Q 11/0005 385/18 |
| 7,177,496 B1 * | 2/2007 | Polynkin | G01J 3/32 385/18 |
| 9,529,157 B2 * | 12/2016 | Zhang | G02B 6/3556 |
| 9,733,432 B2 * | 8/2017 | Jiang | H04Q 11/0005 |
| 2002/0063967 A1 | 5/2002 | Yamamoto et al. | |
| 2003/0210454 A1 * | 11/2003 | Tochio | G02B 6/3588 359/292 |
| 2004/0017964 A1 | 1/2004 | Takeyama et al. | |
| 2004/0105616 A1 | 6/2004 | Kazama et al. | |
| 2004/0258349 A1 * | 12/2004 | Cerato | H04Q 11/0005 385/17 |
| 2005/0213978 A1 * | 9/2005 | Yamashita | H04J 14/0212 398/79 |
| 2007/0041682 A1 | 2/2007 | Takeuchi et al. | |
| 2008/0031569 A1 | 2/2008 | Bruns | |
| 2008/0050064 A1 | 2/2008 | Sakai et al. | |
| 2008/0137172 A1 | 6/2008 | Staker et al. | |
| 2012/0069421 A1 * | 3/2012 | Fu | G01J 3/0205 359/290 |
| 2013/0107347 A1 * | 5/2013 | Chau | G02B 6/3518 359/290 |
| 2013/0108266 A1 * | 5/2013 | Fu | G02B 6/3518 398/48 |
| 2013/0243372 A1 * | 9/2013 | Chen | G02B 7/1827 385/18 |
| 2013/0336615 A1 * | 12/2013 | Wang | G02B 6/3588 385/18 |
| 2016/0124157 A1 | 5/2016 | Zhang et al. | |
| 2017/0293137 A1 * | 10/2017 | Zhao | G02B 6/35 |

OTHER PUBLICATIONS

Foreign Communication From a Counterpart Application, PCT Application No. PCT/CN2014/094512, English Translation of International Search Report dated Sep. 9, 2015, 2 pages.

Foreign Communication From a Counterpart Application, PCT Application No. PCT/CN2014/094512, English Translation of Written Opinion dated Sep. 9, 2015, 5 pages.

Foreign Communication From a Counterpart Application, European Application No. 14908669.6, Extended European Search Report dated Nov. 28, 2017, 6 pages.

* cited by examiner

OPTICAL SWITCH USING ALIGNED COLLIMATOR ARRAYS THAT ARE SPECIFICALLY ANGLED TO FACING MEMS CHIPS

CROSS-REFERENCE TO RELATED APPLICATION

This application is a continuation of International Patent Application No. PCT/CN2014/094512 filed on Dec. 22, 2014, which is hereby incorporated by reference in its entirety.

TECHNICAL FIELD

Embodiments of the present disclosure relate to optical communications technologies, and in particular, to an optical switch.

BACKGROUND

With rapid development of network technologies, people have increasing requirements for information, and also have higher requirements for throughout capabilities of a communications network. Therefore, it is an inevitable development trend to establish an all-optical communications network. The all-optical communications network uses a dense wavelength division multiplexing (DWDM) technology to expand capacities on a trunk and uses a reconfiguration optical add-drop multiplexer (ROADM) and an optical cross-connect (OXC) to switch a path on a cross-connect node. As a core component of the ROADM and the OXC, an optical switch is greatly important in switching an optical path on a cross-connect node.

A three dimensional (3D) micro-electro-mechanical system (MEMS) optical switch is a most important optical switch of large-scale optical switches. The optical switch includes an input collimator array, an input MEMS chip, an output MEMS chip, and an output collimator array. Both the input collimator array and the output collimator array include an optical fiber array and a lens array, and both the input MEMS chip and the output MEMS chip include a micromirror array. Each micromirror of the micromirror array may rotate around two perpendicular axles that are on a surface of the input MEMS chip or the output MEMS chip. An optical signal is transmitted, through an optical fiber array of the input collimator array, to a lens of a corresponding lens array, and is incident on a micromirror of a micromirror array on the input MEMS chip. The optical signal is reflected to a micromirror of a micromirror array on the output MEMS chip by rotating the micromirror on the input MEMS chip, reflected to a lens of a lens array of the output collimator array by rotating the micromirror on the output MEMS chip, and then output using an optical fiber corresponding to the lens of the output collimator array. In order to ensure that the optical signal reflected by the micromirror of the micromirror array on the input MEMS chip is not blocked by the input collimator array and is reflected to the micromirror of the micromirror array on the output MEMS chip, an included angle β exists between a surface of a lens array of the input collimator array and a surface of the micromirror array on the input MEMS chip and between a surface of the micromirror array on the output MEMS chip and a surface of the lens array of the output collimator array. Lenses of the lens array of the output collimator array are arranged at an equal spacing L in two perpendicular directions on the surface of the lens array. Micromirrors of the micromirror array on the output MEMS chip are arranged at the equal spacing L in one of two perpendicular directions on the surface of the micromirror array, and arranged at an equal spacing L/Cos β in the other direction.

The angle β is basically different for optical switches of different sizes. In this case, for the optical switches of different sizes, spacings between micromirrors of micromirror arrays on MEMS chips thereof are different. Therefore, there is a need to design different MEMS chips for optical switches of different sizes. This leads to relatively complex design and manufacturing processes of optical switches of multiple sizes.

SUMMARY

Embodiments of the present disclosure provide an optical switch in order to resolve a problem that design and manufacturing processes of optical switches of multiple sizes are relatively complex.

According to a first aspect, an embodiment of the present disclosure provides an optical switch, including an input collimator array, an input MEMS chip, an output MEMS chip, and an output collimator array, where an included angle β exists between a surface of a lens array of the input collimator array and a surface of a micromirror array on the input MEMS chip. The included angle β exists between a surface of a micromirror array on the output MEMS chip and a surface of a lens array of the output collimator array. The surface of the lens array of the input collimator array is parallel and opposite to the surface of the lens array of the output collimator array, and the surface of the micromirror array on the input MEMS chip is parallel and opposite to the surface of the micromirror array on the output MEMS chip. Micromirrors of the micromirror array on the output MEMS chip are arranged at an equal spacing L both in a direction parallel to a first direction and in a direction perpendicular to the first direction, where the first direction is a direction of an intersection line of planes to which the surface of the lens array of the output collimator array and the surface of the micromirror array on the output MEMS chip belong, and lenses of the lens array of the output collimator array are arranged at the equal spacing L in the direction parallel to the first direction and arranged at an equal spacing L Cos β in the direction perpendicular to the first direction.

According to a second aspect, an embodiment of the present disclosure provides an optical switch, including an input collimator array, an input MEMS chip, an output MEMS chip, an output collimator array, and a reflector, where a surface of a lens array of the input collimator array and a surface of a lens array of the output collimator array belong to a same plane. A surface of a micromirror array on the input MEMS chip and a surface of a micromirror array on the output MEMS chip belong to a same plane, or a surface of a micromirror array on the input MEMS chip is parallel to but not opposite to a surface of a micromirror array on the output MEMS chip. The reflector is located obliquely above the micromirror array on the input MEMS chip and the micromirror array on the output MEMS chip. The reflector is configured to reflect signals reflected by micromirrors of the micromirror array on the input MEMS chip such that the signals are incident on micromirrors of the micromirror array on the output MEMS chip, and an included angle β exists between the surface of the lens array of the input collimator array and the surface of the micromirror array on the input MEMS chip, and an included angle β exists between the surface of the micromirror array on the output MEMS chip and the surface of the lens array of the output collimator array. The micromirrors of the micromirror array on the output MEMS chip are arranged at an equal spacing L both in a direction parallel to a third direction and in a direction perpendicular to the third direction, where the third direction is a direction of an intersection line of planes to which the surface of the micromirror array on the output MEMS chip and the surface of the lens array of the output collimator array belong, and lenses of the lens array of the output collimator array are arranged at the equal spacing L in the direction parallel to the third direction and arranged at an equal spacing L Cos β in the direction perpendicular to the third direction.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Embodiment 1

Figure 1:
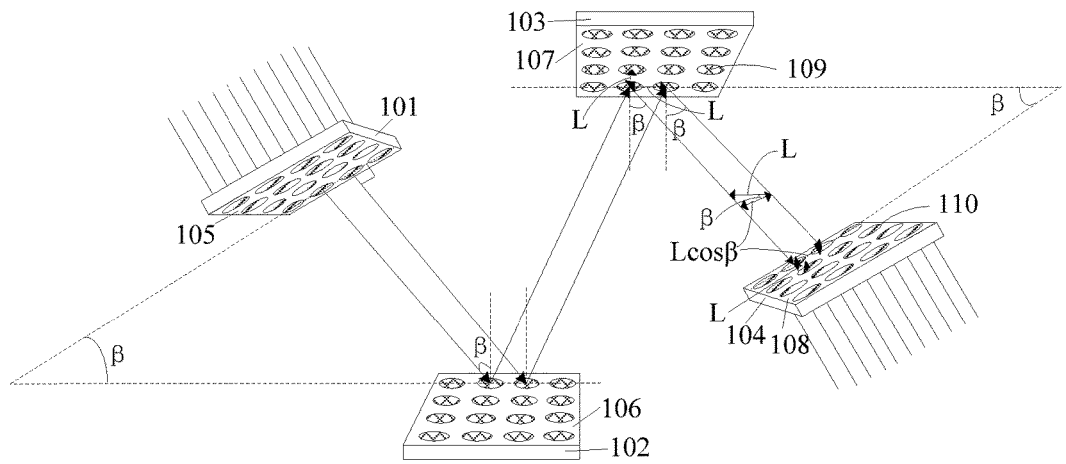
FIG. 1 is a schematic structural diagram of an optical switch according to Embodiment 1 of the present disclosure.

The embodiments of the present disclosure provide an optical switch. The optical switch may be disposed inside an ROADM and an OXC and configured to switch an optical path for an optical signal on a cross-connect node. FIG. 1 is a schematic structural diagram of an optical switch according to Embodiment 1 of the present disclosure. As shown in FIG. 1, the optical switch includes an input collimator array 101, an input MEMS chip 102, an output MEMS chip 103, and an output collimator array 104. An included angle β exists between a surface 105 of a lens array of the input collimator array 101 and a surface 106 of a micromirror array on the input MEMS chip 102. An included angle β exists between a surface 107 of a micromirror array on the output MEMS chip 103 and a surface 108 of a lens array of the output collimator array 104.

The included angle between the surface 105 of the lens array of the input collimator array 101 and the surface 106 of the micromirror array on the input MEMS chip 102 is β. In this way, an included angle between an optical signal incident on a micromirror of the micromirror array on the input MEMS chip 102 and a normal direction of the micromirror is also β. The included angle between the surface 107 of the micromirror array on the output MEMS chip 103 and the surface 108 of the lens array of the output collimator array 104 is β. In this way, an included angle between an optical signal incident on a micromirror of the micromirror array on the output MEMS chip 103 and a normal direction of the micromirror is also β.

The surface 105 of the lens array of the input collimator array 101 is parallel and opposite to the surface 108 of the lens array of the output collimator array 104. The surface 106 of the micromirror array on the input MEMS chip 102 is parallel and opposite to the surface 107 of the micromirror array on the output MEMS chip 103.

In the optical switch, a lens of the lens array of the input collimator array 101 may emit the optical signal vertically such that the optical signal is incident on the micromirror of the micromirror array on the input MEMS chip 102. The optical signal is reflected by the micromirror of the micromirror array on the input MEMS chip 102 to the micromirror of the micromirror array on the output MEMS chip 103 by rotating the micromirror of the micromirror array on the input MEMS chip 102. Then, the optical signal is emitted and incident vertically on a lens of the lens array of the output collimator array 104 by rotating the micromirror of the micromirror array on the output MEMS chip 103. The input collimator array 101 may collimate the received optical signal using the lens of the lens array and emit the received optical signal to the micromirror of the micromirror array on the input MEMS chip 102. Correspondingly, the output collimator array 104 may collimate, using the lens of the lens array, the received optical signal reflected by the micromirror of the micromirror array on the output MEMS chip 103 and output the received optical signal.

The micromirror of the micromirror array on the input MEMS chip 102 and the micromirror of the micromirror array on the output MEMS chip 103 may be a microreflector of any shape of a circle, an oval, or a rectangle. Micromirrors of the micromirror array on the input MEMS chip 102 and micromirrors of the micromirror array on the output MEMS chip 103 may be arranged together in a rectangle, or may be arranged together in a hexagon. In this way, if the micromirrors of the micromirror array on the input MEMS chip 102 and the micromirrors of the micromirror array on the output MEMS chip 103 may be arranged together in a rectangle, lenses of the lens array of the input collimator array 101 and lenses of the lens array of the output collimator array 104 may also be arranged together in a rectangle. If the micromirrors of the micromirror array on the input MEMS chip 102 and the micromirrors of the micromirror array on the output MEMS chip 103 may be arranged together in a hexagon, lenses of the lens array of the input collimator array 101 and lenses of the lens array of the output collimator array 104 may also be arranged together in a hexagon.

The optical signal emitted by the lens of the lens array of the input collimator array 101 may be an optical signal input using an optical fiber, corresponding to the lens, of an optical fiber array of the input collimator array 101.

Because the included angle β exists both between the surface 105 of the lens array of the input collimator array 101 and the surface 106 of the micromirror array on the input MEMS chip 102 and between the surface 107 of the micromirror array on the output MEMS chip 103 and the surface 108 of the lens array of the output collimator array 104, the lens array of the input collimator array 101 and the lens array of the output collimator array 104 does not block the optical signal reflected by the micromirror of the micromirror array on the input MEMS chip 102.

That the surface 106 of the micromirror array on the input MEMS chip 102 is parallel and opposite to the surface 107 of the micromirror array on the output MEMS chip 103 may indicate that the surface 106 of the micromirror array on the input MEMS chip 102 and the surface 107 of the micromirror array on the output MEMS chip 103 face two opposite directions respectively. In this way, the optical signal reflected by the micromirror of the micromirror array on the input MEMS chip 102 can be incident on the micromirror of the micromirror array on the output MEMS chip 103. That the surface 105 of the lens array of the input collimator array 101 is parallel and opposite to the surface 108 of the lens array of the output collimator array 104 may indicate that the surface 105 of the lens array of the input collimator array 101 and the surface 108 of the lens array of the output collimator array 104 face two opposite directions respectively. In this way, the lens of the lens array of the output collimator array 104 can receive the optical signal reflected by the micromirror of the micromirror array on the output MEMS chip 103.

Micromirrors 109 of the micromirror array on the output MEMS chip 103 are arranged at an equal spacing L both in a direction parallel to a first direction and in a direction perpendicular to the first direction. The first direction is a direction of an intersection line of planes to which the surface 108 of the lens array of the output collimator array 104 and the surface 107 of the micromirror array on the output MEMS chip 103 belong.

Lenses 110 of the lens array of the output collimator array 104 are arranged at the equal spacing L in the direction parallel to the first direction and arranged at an equal spacing L Cos β in the direction perpendicular to the first direction.

Optionally, one lens of the lens array of the input collimator array 101 corresponds to one optical fiber of the optical fiber array of the input collimator array 101. Correspondingly, one lens of the lens array of the output collimator array 104 corresponds to one optical fiber of an optical fiber array of the output collimator array 104. The optical fiber of the optical fiber array of the input collimator array 101 is configured to receive an optical signal of an optical communications network. The optical fiber of the optical fiber array of the output collimator array 104 is configured to output an optical signal to the optical communications network.

A micromirror of the micromirror array on the output MEMS chip 103 may be rotated along the direction parallel to the first direction, on the plane to which the surface of the micromirror array on the output MEMS chip 103 belongs, or may be rotated along the direction perpendicular to the first direction, on the plane to which the surface of the micromirror array on the output MEMS chip 103 belongs. According to the optical switch provided in this embodiment of the present disclosure, a rotation angle of the micromirror of the micromirror array on the output MEMS chip 103 may be controlled such that an optical signal received by the micromirror of the micromirror array on the output MEMS chip 103 is reflected to a target lens of the lens array of the output collimator array 104, and the optical signal received by the target lens is transmitted to an optical fiber, corresponding to the target lens, of the optical fiber array of the output collimator array 104, thereby switching an optical path.

A quantity of output ports of the optical switch is determined according to a quantity of the micromirrors of the micromirror array on the input MEMS chip 102 and a quantity of the micromirrors 109 of the micromirror array on the output MEMS chip 103. A coverage area of an optical signal reflected by a micromirror of the micromirror array on the input MEMS chip 102 of the optical switch to the micromirror array on the output MEMS chip 103 is determined according to a rotation angle of the micromirror of the micromirror array on the input MEMS chip 102, and a quantity of micromirrors within the coverage area of the optical signal is determined according to spacings between the micromirrors 109 of the micromirror array on the output MEMS chip 103.

According to the optical switch provided in this embodiment of the present disclosure, the spacings between the micromirrors 109 of the micromirror array on the output MEMS chip 103 are all L, that is, are unrelated to an included angle β. Therefore, according to the optical switch according to this embodiment of the present disclosure, for optical switches of different sizes, because spacings between micromirrors of micromirror arrays on output MEMS chips thereof are all the same, there is no need to design different output MEMS chips for the optical switches of different sizes. This simplifies design and manufacturing processes of optical switches of multiple sizes.

Because there is no need to design and manufacture different output MEMS chips for optical switches of different sizes according to the optical switch in Embodiment 1 of the present disclosure, and the optical switches of different sizes have a same output MEMS chip, mass production of output MEMS chips may be further implemented according to Embodiment 1 of the present disclosure. In addition, because a design and manufacturing technology of a collimator array is relatively mature, design and manufacturing efficiency of an optical switch may be further improved according to Embodiment 1 of the present disclosure.

It should be noted that the micromirror array on the input MEMS chip 102 may use a micromirror array having a structure similar to that of a micromirror array on an input MEMS chip of an existing optical switch, that is, spacings between micromirrors of the micromirror array are related to β, for example, the spacing is L/Cos β, or may be different from a micromirror array on an input MEMS chip of an existing optical switch. Correspondingly, the lens array of the input collimator array 101 may use a lens array having a structure similar to that of a lens array of an input collimator array of the existing optical switch, or may be a lens array having another structure. This embodiment of the present disclosure is not limited thereto.

Embodiment 2

Figure 2A:
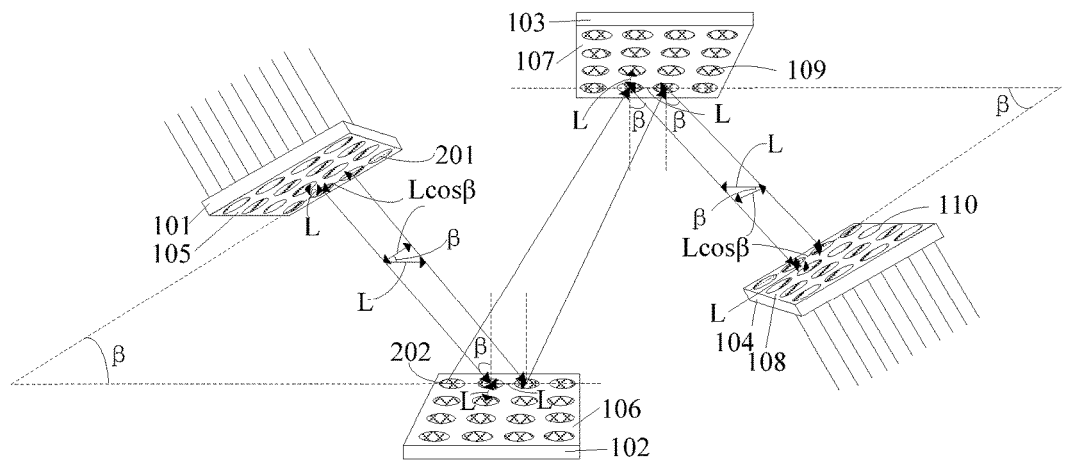
FIG. 2A is a schematic structural diagram of an optical switch according to Embodiment 2 of the present disclosure.

This embodiment of the present disclosure further provides an optical switch. FIG. 2A is a schematic structural diagram of an optical switch according to Embodiment 2 of the present disclosure.

As shown in FIG. 2A, based on the optical switch in Embodiment 1, lenses 201 of a lens array of an input collimator array 101 are arranged at an equal spacing L in a direction parallel to a second direction and arranged at an equal spacing L Cos β in a direction perpendicular to the second direction. The second direction is a direction of an intersection line of planes to which a surface 105 of the lens array of the input collimator array 101 and a surface 106 of a micromirror array of an input chip 102 belong.

Micromirrors 202 of the micromirror array on the input MEMS chip 102 are arranged at the equal spacing L both in the direction parallel to the second direction and in the direction perpendicular to the second direction.

According to the optical switch provided in this embodiment of the present disclosure, based on the solution of Embodiment 1, the micromirrors 202 of the micromirror array on the input MEMS chip 102 are arranged at the equal spacing L both in the direction parallel to the second direction and in the direction perpendicular to the second direction. That is, spacings between the micromirrors 202 of the micromirror array on the input MEMS chip 102 of the optical switch and spacings between micromirrors 109 of a micromirror array on an output MEMS chip 103 of the optical switch are all L, that is, are unrelated to β. For optical switches of different sizes, spacings between micromirrors of a micromirror array on an input MEMS chip and spacings between micromirrors of a micromirror array on an output MEMS chip are the same. Therefore, there is no need to design different input MEMS chips and output MEMS chips for the optical switches of different sizes. This simplifies design and manufacturing processes of the optical switches of multiple sizes, avoids developing chips of the optical switches of different sizes for multiple times, reduces costs of chip development, and implements mass production of chips.

Because there is no need to design and manufacture different output MEMS chips and input MEMS chips for optical switches of different sizes according to the optical switch in Embodiment 2 of the present disclosure, and the optical switches of different sizes have a same output MEMS chip and input MEMS chip, mass production of input MEMS chips and output MEMS chips can be implemented according to Embodiment 2 of the present disclosure.

For example, if the included angle β is 30°, in the optical switch in Embodiment 2 of the present disclosure, a maximum rotation angle of the micromirror 202 of the micromirror array on the input MEMS chip 102 is 8°, and a length of an optical path from a micromirror 202 of the micromirror array on the input MEMS chip 102 to a micromirror 109 of a micromirror array on an output MEMS chip 103 is 50 millimeters (mm). L is equal to 1 mm, that is, spacings between the micromirrors 202 of the micromirror array on the input MEMS chip 102 are 1 mm in the direction parallel to the second direction and 1 mm in the direction perpendicular to the second direction. Spacings between micromirrors 109 of the micromirror array on the output MEMS chip 103 are 1 mm both in a direction parallel to the second direction and in a direction perpendicular to the second direction.

Figure 2B:
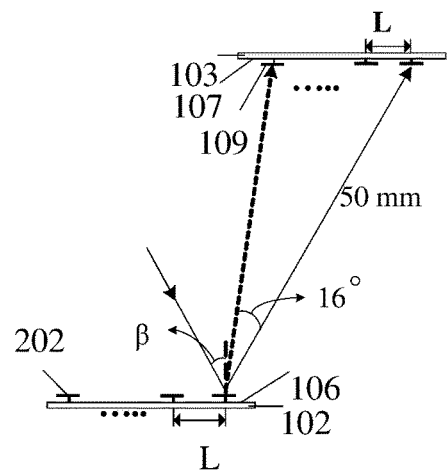
FIG. 2B is a schematic diagram of an optical switch size according to Embodiment 2 of the present disclosure.

FIG. 2B is a schematic diagram of an optical switch size according to Embodiment 2 of the present disclosure. As shown in FIG. 2B, if the micromirror 202 of the micromirror array on the input MEMS chip 102 is rotated by 8°, because an included angle between light reflected by a reflective surface and light incident on the reflective surface is twice a rotation angle of the reflective surface, an angle difference between light reflected by the micromirror 202 and light incident on the micromirror 202 is 16°. In this way, a coverage area of an optical signal reflected to a micromirror 109 of the micromirror array on the output MEMS chip 103 by rotating the micromirror 202 of the micromirror array on the input MEMS chip 102 is a micromirror range corresponding to the angle difference of 16° between the light reflected by the micromirror 202 and the light incident on the micromirror 202. Therefore, it can be determined according to the spacing L that the optical switch includes 168 output micromirrors. In addition, because an optical path is reversible, and the spacings between the micromirrors 202 of the micromirror array on the input MEMS chip 102 and the spacings between the micromirrors 109 of the micromirror array on the output MEMS chip 103 are the same, the optical switch also includes 168 input micromirrors. In this way, both quantities of the input micromirrors 202 and output micromirrors 109 of the optical switch are 168.

In an existing optical switch, if the included angle β is 30°, a maximum rotation angle of a micromirror of a micromirror array on an input MEMS chip is 8°, and a length of an optical path from the micromirror of the micromirror array on the input MEMS chip to a micromirror of a micromirror array on an output MEMS chip is 50 mm. L is equal to 1 mm. That is, spacings between micromirrors of the micromirror array on the input MEMS chip are 1 mm in a direction parallel to a direction of an intersection line of a surface of the micromirror array on the input MEMS chip and a surface of a lens array of an input collimator array, and are l/cos β, that is, 1.155 mm, in a direction perpendicular to the direction of the intersection line of the surface of the micromirror array on the input MEMS chip and the surface of the lens array of the input collimator array. Spacings between micromirrors of the micromirror array on the output MEMS chip are 1 mm in a direction parallel to a direction of an intersection line of planes to which a surface of the micromirror array on the output MEMS chip and a surface of a lens array of an output collimator array belong, and are also 1.155 mm in a direction perpendicular to the direction of the intersection line of the planes to which the surface of the micromirror array on the output MEMS chip and the surface of the lens array of the output collimator array belong. After the micromirror of the micromirror array on the input MEMS chip is rotated by 8°, an angle difference between light reflected by the micromirror and light incident on the micromirror is 16°. In this way, by rotating the micromirror of the micromirror array on the input MEMS chip, a coverage area of an optical signal reflected to the micromirror array on the output MEMS chip is a micromirror array range corresponding to the angle difference of 16° between the light reflected by the micromirror of the micromirror array on the input MEMS chip and the light incident on the micromirror. Therefore, it can be determined according to the spacing L that the optical switch includes 144 output micromirrors. In addition, because an optical path is reversible, and the spacings of the micromirror array on the input MEMS chip and the spacings of the micromirror array on the output MEMS chip are the same, the optical switch also includes 144 input micromirrors. In this way, both quantities of the input micromirrors and output micromirrors of the existing optical switch are 144.

Therefore, according to the optical switch provided in this embodiment of the present disclosure, based on the optical switch in Embodiment 1, quantities of output micromirrors and input micromirrors of the optical switch can be increased simultaneously.

Embodiment 3

Figure 3:
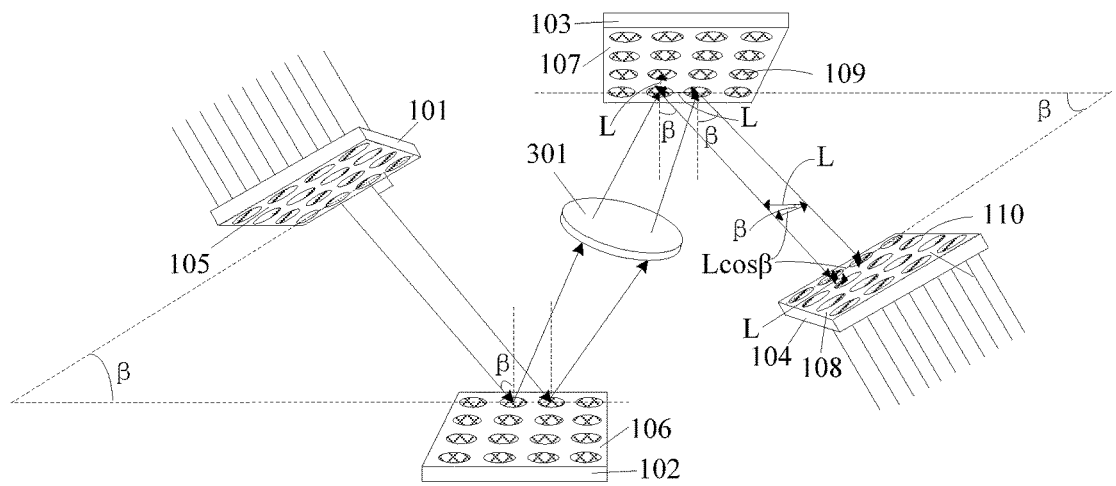
FIG. 3 is a schematic structural diagram of an optical switch according to Embodiment 3 of the present disclosure.

Embodiment 3 of the present disclosure further provides an optical switch. FIG. 3 is a schematic structural diagram of an optical switch according to Embodiment 3 of the present disclosure. As shown in FIG. 3, based on the optical switch provided in Embodiment 1, the optical switch further includes a convex lens 301.

The convex lens 301 is parallelly placed between a micromirror array on an input MEMS chip 102 and a micromirror array on an output MEMS chip 103.

The convex lens 301 is configured to refract twice optical signals reflected by micromirrors of the micromirror array on the input MEMS chip 102 such that the optical signals are incident on micromirrors of the micromirror array on the output MEMS chip 103.

Optionally, the convex lens 301 may be a Fourier lens.

If an emergent direction of the optical signal deflects after the convex lens 301 refracts twice the optical signal reflected by the micromirror of the micromirror array on the input MEMS chip 102, a coverage area of the optical signal that is incident on the micromirror array on the output MEMS chip 103 is enlarged, and a size of the optical switch is increased.

According to the optical switch provided in this embodiment of the present disclosure, the size of the optical switch can be increased when a rotation angle of a micromirror and an included angle β are not changed.

It should be noted that, Embodiment 3 of the present disclosure is described using an example in which a new optical switch is obtained by adding a convex lens 301 based on the optical switch in Embodiment 1. However, the optical switch provided in Embodiment 3 of the present disclosure may further be a new optical switch obtained by adding a convex lens 301 based on the optical switch in Embodiment 2. Spacings between lenses of a lens array of an input collimator array 101 and spacings between micromirrors of a micromirror array on an input MEMS chip 102 may be as described in Embodiment 2, and details are not further described in this embodiment of the present disclosure.

Embodiment 4

Figure 4:
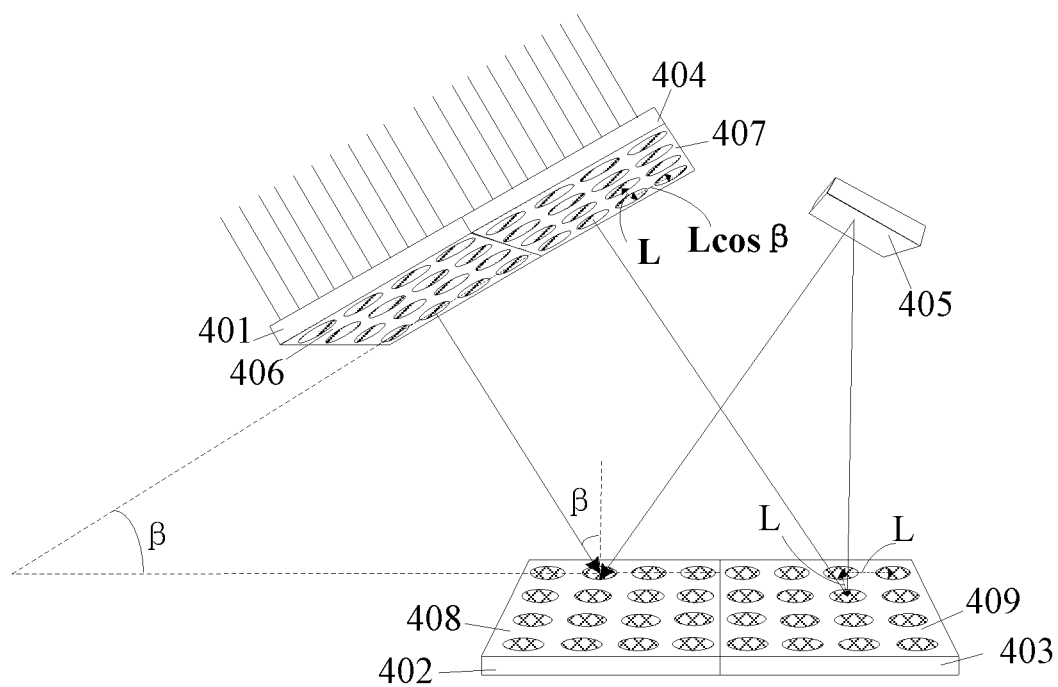
FIG. 4 is a schematic structural diagram of an optical switch according to Embodiment 4 of the present disclosure.

Embodiment 4 of the present disclosure further provides an optical switch. FIG. 4 is a schematic structural diagram of an optical switch according to Embodiment 4 of the present disclosure.

As shown in FIG. 4, the optical switch may include an input collimator array 401, an input MEMS chip 402, an output MEMS chip 403, an output collimator array 404, and a reflector 405.

A surface 406 of a lens array of the input collimator array 401 and a surface 407 of a lens array of the output collimator array 404 belong to a same plane. A surface 408 of a micromirror array on the input MEMS chip 402 and a surface 409 of a micromirror array on the output MEMS chip 403 belong to a same plane, or a surface 408 of a micromirror array on the input MEMS chip 402 is parallel but not opposite to a surface 409 of a micromirror array on the output MEMS chip 403.

The reflector 405 is located obliquely above the micromirror array on the input MEMS chip 402 and the micromirror array on the output MEMS chip 403. The reflector 405 may be configured to reflect signals reflected by micromirrors of the micromirror array on the input MEMS chip 402 such that the signals are incident on micromirrors of the micromirror array on the output MEMS chip 403.

An included angle β exists between the surface 406 of the lens array of the input collimator array 401 and the surface 408 of the micromirror array on the input MEMS chip 402, and an included angle β exists between the surface 409 of the micromirror array on the output MEMS chip 403 and the surface 407 of the lens array of the output collimator array 404.

Micromirrors of the micromirror array on the output MEMS chip 403 are arranged at an equal spacing L in a direction parallel to a third direction and in a direction perpendicular to the third direction. The third direction is a direction of an intersection line of planes to which the surface 409 of the micromirror array on the output MEMS chip 403 and the surface 407 of the lens array of the output collimator array 404 belong.

Lenses of the lens array of the output collimator array 404 are arranged at the equal spacing L in the direction parallel to the third direction and arranged at an equal spacing L Cos β in the direction perpendicular to the third direction.

In the optical switch, a lens of the lens array of the input collimator array 401 may emit an optical signal vertically such that the optical signal is incident on the micromirror of the micromirror array on the input MEMS chip 402. The optical signal is reflected by the micromirror of the micromirror array on the input MEMS chip 402 to the reflector 405 by rotating a micromirror of a micromirror array of the input MEMS chip 402, and reflected by the reflector 405 to the micromirror of the micromirror array on the output MEMS chip 403. The optical signal is incident on a lens of the lens array of the output collimator array 404 by rotating the micromirror of the micromirror array on the output MEMS chip 403.

That the surface 406 of the lens array of the input collimator array 401 and the surface 407 of the lens array of the output collimator array 404 belong to a same plane means that the input collimator array 401 and the output collimator array 404 may be designed and manufactured on a same chip. That the surface 408 of the micromirror array on the input MEMS chip 402 and the surface 409 of the micromirror array on the output MEMS chip 403 belong to a same plane means that the input MEMS chip 402 and the output MEMS chip 403 may be designed and manufactured on a same chip. If the surface 408 of the micromirror array on the input MEMS chip 402 is parallel but not opposite to the surface 409 of the micromirror array on the output MEMS chip 403, the input MEMS chip 402 and the output MEMS chip 403 are different chips. That the surface 408 of the micromirror array on the input MEMS chip 402 is parallel but not opposite to the surface 409 of the micromirror array on the output MEMS chip 403 may be that the surface 408 of the micromirror array on the input MEMS chip 402 and the surface 409 of the micromirror array on the output MEMS chip 403 face a same direction.

It should be noted that Embodiment 4 of the present disclosure provides description only using a scenario shown in FIG. 4 as an example in which the surface 408 of the micromirror array on the input MEMS chip 402 and the surface 409 of the micromirror array on the output MEMS chip 403 belong to a same plane. However, the surface 408 of the micromirror array on the input MEMS chip 402 and the surface 409 of the micromirror array on the output MEMS chip 403 may belong to different planes, and be parallel but not opposite to each other. In a scenario in which the surface 408 of the micromirror array on the input MEMS chip 402 is parallel but not opposite to the surface 409 of the micromirror array on the output MEMS chip 403, relative positions of other components of the optical switch are similar. A distance between the surface 408 of the micromirror array on the input MEMS chip 402 and the surface 409 of the micromirror array on the output MEMS chip 403 may be preset according to a parameter such as an included angle β and/or a rotation angle of a micromirror.

The input collimator array 401, the input MEMS chip 402, the output MEMS chip 403, and the output collimator array 404 that are provided in Embodiment 4 of the present disclosure are similar to those in Embodiment 1, and differences lie only in that relative position relationships between all of the input collimator array, the input MEMS chip, the output MEMS chip, and the output collimator array are different, and that the optical switch further includes a reflector. For the part, similar to that of Embodiment 1, of Embodiment 4 of the present disclosure, details are not further described herein.

According to the optical switch provided in Embodiment 4 of the present disclosure, micromirrors of a micromirror array on an output MEMS chip 403 are arranged at an equal spacing L in a direction parallel to a third direction and in a direction perpendicular to the third direction, where the third direction is a direction of an intersection line of planes to which a surface of the micromirror array on the output MEMS chip 403 and a surface of a lens array of an output collimator array 404 belong, and lenses of output collimator array 404 are arranged at the equal spacing L in a direction parallel to a third direction and arranged at an equal spacing L Cos β in a direction perpendicular to the third direction. Spacings between the micromirrors of the micromirror array on the output MEMS chip 403 are all L, that is, are unrelated to an included angle β. Therefore, according to the optical switch provided in this embodiment of the present disclosure, because spacings between micromirrors of micromirror arrays on output MEMS chips are all the same for optical switches of different sizes, there is no need to design different MEMS chips for the optical switches of different sizes. This simplifies design and manufacturing processes of optical switches of multiple sizes.

Optionally, lenses of the lens array of the input collimator array 401 of the optical switch in Embodiment 4 are arranged at the equal spacing L in the direction parallel to the third direction and are arranged at the equal spacing L Cos β in the direction perpendicular to the third direction.

Micromirrors of the micromirror array on the input MEMS chip 402 are arranged at the equal spacing L both in the direction parallel to the third direction and in the direction perpendicular to the third direction.

Optionally, the reflector 405 is a planar reflector, a triangle reflector, or a concave reflector.

Figure 5:
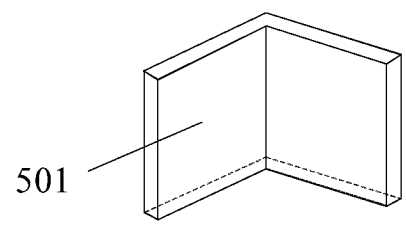
FIG. 5 is a schematic structural diagram of a triangle reflector according to Embodiment 4 of the present disclosure.
Figure 6:
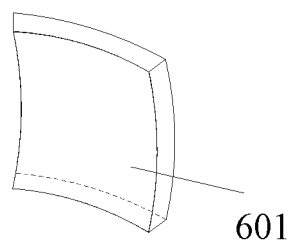
FIG. 6 is a schematic structural diagram of a concave reflector according to Embodiment 4 of the present disclosure.

That is, the reflector 405 in FIG. 4 is not limited to a planar reflector, or may be a reflector of another form, for example, a triangle reflector or a concave reflector. Embodiment 4 of the present disclosure further provides a triangle reflector and a concave reflector. FIG. 5 is a schematic structural diagram of a triangle reflector according to Embodiment 4 of the present disclosure. FIG. 6 is a schematic structural diagram of a concave reflector according to Embodiment 4 of the present disclosure. The concave reflector may be of a structure shown in FIG. 6, or may be of another similar structure. If the reflector 405 is a triangle reflector 501 shown in FIG. 5 or a concave reflector 601 shown in FIG. 6, position relationships between all components inside the optical switch may be similar to those in the foregoing embodiments, and details are not further described herein. It should be noted that the triangle reflector may be of a structure shown in FIG. 5, or may be of a similar structure.

According to the optical switch provided in Embodiment 4 of the present disclosure, the micromirrors of the micromirror array on the input MEMS chip 402 are arranged at the equal spacing L in the direction parallel to the third direction and in the direction perpendicular to the third direction. That is, spacings between the micromirrors of the micromirror array on the input MEMS chip 402 of the optical switch and the spacings between the micromirrors of the micromirror array on the output MEMS chip 403 of the optical switch are all L, that is, are unrelated to β.

For optical switches of different sizes, spacings between micromirrors of a micromirror array on an input MEMS chip and spacings between micromirrors of a micromirror array on an output MEMS chip are the same in two perpendicular directions. Therefore, there is no need to design different input MEMS chips and output MEMS chips for the optical switches of different sizes. This simplifies design and manufacturing processes of the optical switch of multiple sizes, avoids developing chips of the optical switch of different sizes for multiple times, and implements mass production of chips.

In addition, according to the optical switch provided in this embodiment of the present disclosure, the optical switches of different sizes have a same input chip and output chip and have different input collimators and output collimators. Because a manufacturing technology of a collimator is mature and simple, and manufacturing and development processes of a chip is relatively complex, according to the optical switch provided in Embodiment 4 of the present disclosure, a difficulty in manufacturing optical switch of different sizes may be reduced when mass production of chips is implemented.

Finally, it should be noted that the foregoing embodiments are only intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. An optical switch, comprising:
  an input collimator array;
  an input micro-electro-mechanical system (MEMS) chip coupled to the input collimator array;
  an output MEMS chip coupled to the input MEMS chip; and
  an output collimator array coupled to the output MEMS chip,
  wherein an included angle (β) exists between a surface of a lens array of the input collimator array and a surface of a micromirror array on the input MEMS chip,
  wherein the β exists between a surface of a micromirror array on the output MEMS chip and a surface of a lens array of the output collimator array,
  wherein the surface of the lens array of the input collimator array is parallel and opposite to the surface of the lens array of the output collimator array,
  wherein the surface of the micromirror array on the input MEMS chip is parallel and opposite to the surface of the micromirror array on the output MEMS chip,
  wherein micromirrors of the micromirror array on the output MEMS chip are arranged at an equal spacing (L) both in a direction parallel to a first direction and in a direction perpendicular to the first direction,
  wherein the first direction is a direction of an intersection line of planes to which the surface of the lens array of the output collimator array and the surface of the micromirror array on the output MEMS chip belong, and wherein lenses of the lens array of the output collimator array are arranged at the equal L in the direction parallel to the first direction and arranged at an equal spacing (L Cos β) in the direction perpendicular to the first direction.

2. The optical switch according to claim 1, wherein lenses of the lens array of the input collimator array are arranged at the equal L in a direction parallel to a second direction and arranged at the equal L Cos β in a direction perpendicular to the second direction, wherein the second direction is a direction of an intersection line of planes to which the surface of the lens array of the input collimator array and the surface of the micromirror array on the input MEMS chip belong, and wherein micromirrors of the micromirror array on the input MEMS chip are arranged at the equal L both in the direction parallel to the second direction and in the direction perpendicular to the second direction.

3. The optical switch according to claim 1, further comprising a convex lens, wherein the convex lens is parallelly placed between the micromirror array on the input MEMS chip and the micromirror array on the output MEMS chip, and wherein the convex lens is configured to refract twice optical signals reflected by the micromirrors of the micromirror array on the input MEMS chip such that the optical signals are incident on micromirrors of the micromirror array on the output MEMS chip.

4. The optical switch according to claim 3, wherein the convex lens is a Fourier lens.

5. An optical switch, comprising:
an input collimator array;
an input micro-electro-mechanical system (MEMS) chip coupled to the input collimator array;
an output MEMS chip coupled to the input MEMS chip;
an output collimator array coupled to the output MEMS chip; and
a reflector coupled to the input MEMS chip and the output MEMS chip,
wherein a surface of a lens array of the input collimator array and a surface of a lens array of the output collimator array belong to a same plane,
wherein a surface of a micromirror array on the input MEMS chip and a surface of a micromirror array on the output MEMS chip belong to another same plane,
wherein the reflector is located obliquely above the micromirror array on the input MEMS chip and the micromirror array on the output MEMS chip, and configured to reflect signals reflected by micromirrors of the micromirror array on the input MEMS chip such that the signals are incident on micromirrors of the micromirror array on the output MEMS chip,
wherein an included angle (β) exists between the surface of the lens array of the input collimator array and the surface of the micromirror array on the input MEMS chip,
wherein the β exists between the surface of the micromirror array on the output MEMS chip and the surface of the lens array of the output collimator array,
wherein the micromirrors of the micromirror array on the output MEMS chip are arranged at an equal spacing (L) both in a direction parallel to a third direction and in a direction perpendicular to the third direction,
wherein the third direction is a direction of an intersection line of planes to which the surface of the micromirror array on the output MEMS chip and the surface of the lens array of the output collimator array belong, and
wherein lenses of the lens array of the output collimator array are arranged at the equal L in the direction parallel to the third direction and arranged at an equal spacing (L Cos β) in the direction perpendicular to the third direction.

6. The optical switch according to claim 5, wherein lenses of the lens array of the input collimator array are arranged at the equal L in the direction parallel to the third direction and arranged at the equal L Cos β in the direction perpendicular to the third direction, and wherein the micromirrors of the micromirror array on the input MEMS chip are arranged at the equal L both in the direction parallel to the third direction and in the direction perpendicular to the third direction.

7. The optical switch according to claim 5, wherein the reflector comprises a planar reflector.

8. The optical switch according to claim 5, wherein the reflector comprises a triangle reflector.

9. The optical switch according to claim 5, wherein the reflector comprises a concave reflector.

10. An optical switch, comprising:
an input collimator array;
an input micro-electro-mechanical system (MEMS) chip coupled to the input collimator array;
an output MEMS chip coupled to the input MEMS chip;
an output collimator array coupled to the output MEMS chip; and
a reflector coupled to the input MEMS chip and the output MEMS chip,
wherein a surface of a lens array of the input collimator array and a surface of a lens array of the output collimator array belong to a same plane,
wherein a surface of a micromirror array on the input MEMS chip is parallel to but not opposite to a surface of a micromirror array on the output MEMS chip,
wherein the reflector is located obliquely above the micromirror array on the input MEMS chip and the micromirror array on the output MEMS chip, and configured to reflect signals reflected by micromirrors of the micromirror array on the input MEMS chip such that the signals are incident on micromirrors of the micromirror array on the output MEMS chip,
wherein an included angle (β) exists between the surface of the lens array of the input collimator array and the surface of the micromirror array on the input MEMS chip,
wherein the β exists between the surface of the micromirror array on the output MEMS chip and the surface of the lens array of the output collimator array,
wherein the micromirrors of the micromirror array on the output MEMS chip are arranged at an equal spacing (L) both in a direction parallel to a third direction and in a direction perpendicular to the third direction,
wherein the third direction is a direction of an intersection line of planes to which the surface of the micromirror array on the output MEMS chip and the surface of the lens array of the output collimator array belong, and
wherein lenses of the lens array of the output collimator array are arranged at the equal L in the direction parallel to the third direction and arranged at an equal spacing (L Cos β) in the direction perpendicular to the third direction.

11. The optical switch according to claim 10, wherein lenses of the lens array of the input collimator array are arranged at the equal L in the direction parallel to the third direction and arranged at the equal L Cos β in the direction perpendicular to the third direction, and wherein the micromirrors of the micromirror array on the input MEMS chip are arranged at the equal L both in the direction parallel to the third direction and in the direction perpendicular to the third direction.

12. The optical switch according to claim 10, wherein the reflector comprises a planar reflector.

13. The optical switch according to claim 10, wherein the reflector comprises a triangle reflector.

14. The optical switch according to claim 10, wherein the reflector comprises a concave reflector.

* * * * *